United States Patent [19]

Herrington et al.

[11] Patent Number: 5,240,884
[45] Date of Patent: Aug. 31, 1993

[54] SILVER-GLASS DIE ATTACH PASTE

[75] Inventors: Tommy L. Herrington, Ramona; Kim-chi T. Le, San Diego; Masyood Akhtar, San Diego; Charles H. Smith, Ramona, all of Calif.

[73] Assignee: Johnson Matthey, Inc.

[21] Appl. No.: 755,576

[22] Filed: Sep. 5, 1991

[51] Int. Cl.⁵ .................................. C03C 8/18
[52] U.S. Cl. ........................ 501/19; 501/21; 501/22; 501/41; 106/1.14
[58] Field of Search ............ 501/11, 14, 17, 20, 501/21, 22, 40; 106/1.05, 1.13, 1.14, 1.19; 252/512, 514, 518, 521; 423/508, 509, 510; 437/232

[56] References Cited

U.S. PATENT DOCUMENTS

| | | | |
|---|---|---|---|
| 4,743,302 | 5/1988 | Dumesnil et al. | 106/1.23 |
| 4,761,224 | 8/1988 | Husson, Jr. et al. | 106/1.14 |
| 4,881,974 | 11/1989 | Herrington | 106/1.14 |
| 4,933,030 | 6/1990 | Dietz | 106/1.14 |
| 5,013,360 | 5/1991 | Finkelstein et al. | 106/1.23 |

Primary Examiner—Mark L. Bell
Assistant Examiner—Michael Marcheschi
Attorney, Agent, or Firm—Cushman, Darby & Cushman

[57] ABSTRACT

A silver-glass paste comprising silver flake, lead vanadium telluride glass, resin, surfactant and a mixture of solvents, said mixture comprising at least two solvents selected from the group consisting of glycol ether, isoparaffin, and terpineol, each of said solvents having a boiling point of from about 170° C. to about 230° C. and a surface tension of from about 20 to about 30 dynes/cm².

6 Claims, No Drawings

SILVER-GLASS DIE ATTACH PASTE

BACKGROUND OF THE INVENTION

The present invention relates to improved silver-glass paste compositions useful for attaching semiconductive elements, e.g. silicon dies, GaAs elements or the like, to appropriate substrates, and to a method for forming electronic components using such pastes.

Prior patents directed to pastes of this general type include U.S. Pat. Nos. 3,497,774; 4,401,767; 4,436,785; 4,459,166; 4,636,254; 4,761,224 and 4,881,974, all hereby incorporated by reference. Typically, these pastes are used for attaching silicon dies to ceramic substrates.

Other improved silver-glass paste compositions are described in U.S. Ser. No. 07/558,327, filed Jul. 27, 1990; Ser. No. 07/248,120, filed Sep. 23, 1988; Ser. No. 07/288,640, filed Dec. 22, 1988 and Ser. No. 07/482,489, filed Feb. 21, 1990, the subject matter of these applications being incorporated herein by reference.

The pastes known in the art typically include the following essential components in the approximate ranges indicated below:

| Component | % by weight |
|---|---|
| silver flake | 55-80 |
| glass frit (e.g. lead borate glass) | 5-25 |
| resin or resin-forming component (e.g. a methacrylate) | 0.0-2 |
| organic solvent | 5-20 |

Other additives, e.g. silver oxide, thixotropic agents, surfactants, or the like also may be included.

In a representative die-attachment process, the paste comprising silver flake, glass frit, resin and solvent is placed in a cavity in a ceramic substrate, the die is placed on the paste and the resulting die/substrate package is fed on a belt through a furnace where the package is heated to remove the organic solvent and sinter the residual silver and glass to bond the die firmly to the substrate. The final bond layer must be completely free of voids. As a consequence, the process usually requires a preliminary drying step in which solvent and other volatiles are evaporated, followed by firing in a furnace to remove residual volatiles and melt the glass.

The preliminary drying step of necessity is quite lengthy, requiring between about 2-10 hours at 60°-80° C., depending on, for size of the die and the surface area of the silver flake particles. Additionally, the ramp rate, i.e. the rate at which the package is fed from the drying step into the furnace, is carefully controlled so as to ensure that organic burnout is at least essentially completed before the sintering of the silver-glass mix takes place. Relatively low temperature ramp rates (e.g. up to 50° C./minute) are very commonly used to ensure solvent removal and optimum results. Belt-type furnaces are normally employed for the firing stage and, depending on the number of temperature zones involved, the dwell time in the furnace can vary from 30-90 minutes or more.

When a large die is bonded, e.g. a die of 400-500 square mils or more, a large amount of bonding agent is needed, and, consequently, a significant amount of solvent and other volatiles must be evaporated. To ensure sufficient evaporation of the volatiles, the drying process may be particularly lengthy and the required ramp rate may be relatively low. The drying time can be decreased by using small silver flakes, which are packed more densely than large flakes and thus permit a faster rate of evaporation. However, when small flakes are used, cracks are likely to form in the bond because sintering tends to proceed too quickly. Thus, effective attachment of a large die to a substrate using conventional methods generally requires the use of large silver particles, and, therefore, a lengthy drying process and use of a relatively low temperature ramp rate.

The silver and glass components in conventional pastes have a tendency to flocculate because of Van der Waals attractive forces, resulting in an increase in free energy of the system when the silver and glass particles are separated from each other. It appears that by using the prior art surfactant additive containing both a lyophobic group which has very little, if any, attraction for the solvent or organic vehicle and a lyophilic group which has a strong attraction for the vehicle, the tendency for flocculation to occur is reduced and paste stability consequently enhanced. Without intending to be limited to any particular theory of operation, it appears that the lyophobic group of the prior art surfactant is adsorbed onto the surface of silver or glass particles to form a steric barrier to the vehicle while the lyophilic portion or "tail" of the surfactant extends into the vehicle or steric layer. Flocculation of particles is inhibited by thickening the steric barrier and physically keeping dispersed particles apart and by reducing the efficiency of interparticle collision. This results in enhanced paste stability with consequent advantages of the possibility of eliminating the drying step, faster heating rates with reduced time to obtain a void-and crack-free bond between silicon die and substrate.

SUMMARY OF THE INVENTION

The pastes of this invention provide excellent wetting of both metal and oxide (aluminum) surfaces and provide a notable improvement over prior art paste solvents such as use of only a straight isoparaffin solvent system in that viscosity stability during dispensing is better. That is, the pastes of this invention are nonsettling while in storage as feed to a dispensing device such as the typical needle dispensers. These pastes also provide excellent adhesion.

This improvement is a result of use of a special formulation which is intended for firing the pastes at a firing temperature range between 370° to 440° C. without a drying step. The formulation, in general, is as follows:

| | % (by weight) |
|---|---|
| silver flake | 55 to 80 |
| lead vanadium telluride glass | 5 to 25 |
| resin | 0.3 to 2 |
| surfactant | 0.1 to 1.5 |
| special solvents mixture | 5 to 20 |

The preferred silver flakes have a surface area at about 0.4 to 1.5 m$^2$/g and a tap density of about 2 to about 4 g/cc.

The lead vanadium telluride glass has a softening range of between about 200° to about 350° C. The lead vanadium telluride glass of this invention may optionally also contain magnesium as shown in the Examples herein. Preferably the glass is composed of from about 15 to about 40 wt. % oxide of PbO, about 20 to about 50 wt. % oxide of $V_2O_5$, about 15 to about 40 wt. % oxide of TeO$_2$, about 5 to about 15 wt. % oxide of Bi$_2$O$_3$, and about 0 to about 1 wt. % oxide of MgO.

The resins can be those resins known for this use as set forth in the above-cited prior art patents, such as alkyl methacrylates, e.g., methyl, ethyl and isobutyl.

The surfactants can also be those known in the prior art cited above, e.g. octyl-phenoxypolyethanol (Triton X-45).

The solvents of this invention are a special mixture of glycol ethers, such as Dowanol, isoparaffins and terpineols having a boiling range of from about 170° to 230° C. and surface tensions of from about 20 to about 30 dynes/cm$^2$, preferably between about 22 and about 27 and most preferably about 26 dynes/cm$^2$.

The combination of the lead vanadium telluride glass and special solvents permits the benefits of this invention, namely, excellent adhesion, viscosity stability, i.e., nonsettling in storage and excellent wetting.

This invention more specifically is a silver-glass paste comprising silver flake, lead vanadium telluride glass, resin, surfactant, and a mixture of solvents. The mixture comprises at least two solvents selected from the group consisting of glycol ether, isoparaffins and terpineol solvents having a boiling point of from about 170° C. to about 230° C. and a surface tension of from about 20 to about 30 dynes/cm$^2$. Preferably the surface tension is between about 22 and 27 dynes/cm$^2$. Also, preferably the paste has silver flake present in an amount of between about 55% to 80% by weight and the glass is present in an amount of between about 5% to about 25% by weight with the resin present in a amount of between about 0.3% and about 2% by weight, the surfactant present in an amount of between about 0.1% and about 1.5 % by weight and the mixture of solvents present in an amount of between about 5% to about 20% by weight. Preferably the mixture of solvents is a mixture of terpineol and glycol ethers or alternatively a mixture of terpineol , glycol ethers, and isoparaffins. More preferably, the glycol ethers are a mixture of propylene glycol n-butyl ether, dipropylene glycol n-butyl ether, and dipropylene glycol monomethyl ether. It is preferred that the solvent in the mixture be present in an amount of from about 1% to 6% by weight of the paste for each solvent.

This invention is also a method of bonding semi-conductive elements to appropriate substrates comprising the steps of applying the silver glass paste described herein to the substrate, placing the element on the paste and then centering the silver and glass to bond the element to the substrate. In another embodiment, this invention is an article of manufacture comprising a substrate, a semi-conductor element attached to the substrate by a bond, and the bond being a silver-filled glass paste according to the invention herein.

BRIEF DESCRIPTION OF THE DRAWINGS

FIG. 1 is a set of curves showing improved dispensing characteristic of the paste of this invention.

DETAILED DESCRIPTION OF THE INVENTION

The pastes of this invention consist essentially of the following:

| Component | % by weight |
|---|---|
| silver flake | 60-80 |
| lead vanadium telluride glass | 8-25 |
| resin | 0.3-2 |
| surfactant | 0.1-1.5 |
| solvent 1 | 1-6 |
| solvent 2 | 1-6 |
| solvent 3 | 1-6 |
| solvent 4 | 1-6 |

Solvent 1 is terpineol; solvent 2, 3 and 4 are glycol ethers. The glass of this invention can also include other elements, e.g., bismuth, magnesium and other like additives, as is known in the art.

The solvents are each one of the above-described solvents. The newly discovered use of these solvents makes possible the notable improvement over use of only a straight isoparaffin solvent systems in viscosity stability during dispensing, excellent wetting and excellent adhesion of the fired paste.

EXAMPLES 1 and 2

The formation used was as follows:

| | |
|---|---|
| silver flake | 73.92% |
| lead vanadium telluride glass | 10.08% |
| resin | 0.30% |
| surfactant | 0.50% |
| solvent 1 | 4.56% |
| solvent 2 | 4.56% |
| solvent 3 | 1.52% |
| solvent 4 | 4.56% |

Solvent 1 is terpineol, C$_{10}$H$_{17}$OH.
Solvent 2 is propylene glycol n-butyl ether.
Solvent 3 is dipropylene glycol n-butyl ether.
Solvent 4 is dipropylene glycol monomethyl ether.

The above formulation is Formula A. For example 2, Formula B is the same as Formula A, except solvent 2 is Isopar L, a C$_{12}$ to C$_{14}$ blend of straight chain is isoparaffins made by Exxon having a flash point of 61° C. (ASTM D56), a specific gravity at 15.6° C. of 0.767 and a viscosity at 15.6° C. of 1.99 cp The glass in both Formula A and B has the following composition.

| | wt. % oxides |
|---|---|
| PbO | 23.9 |
| V$_2$O$_5$ | 43.1 |
| TeO$_2$ | 20.2 |
| Bi$_2$O$_3$ | 12.8 |
| MgO | 0.25 |

Another glass useful for this invention contains no MgO and has the following composition.

| | wt. % oxides |
|---|---|
| PbO | 31.8 |
| V$_2$O$_5$ | 31.8 |
| T3O$_2$ | 27.2 |
| Bi$_2$O$_3$ | 9.2 |

The following table on adhesion and FIG. 1 showing dispensing characteristics illustrate some of the improvements in processing.

The dispensing graph represents dispense weight versus time for a multineedle dispenser. As can be seen paste of Formula A is more linear that the control prior art paste (isoparaffin solvent system disclosed in U.S. Ser. No. 558,327, incorporated by reference above). This indicates the nonsettling characteristics described above.

The adhesion data also shows comparable adhesion values to the control prior art paste.

The formula for the control prior art paste is as follows.

| Component | % by weight |
|---|---|
| silver flake | 77.44 |
| lead phosphovanadate glass (softening point 320° C.) | 10.56 |
| resin | 0 |
| thixotrope (Thixcin R) | 0.35 |
| surfactant (Triton X-45) | 0.50 |
| solvent (Isopar L) | 11.15 |

| SILVER GLASS DIE ATTACH PASTE ADHESION (lbs.) | | | | |
|---|---|---|---|---|
| PASTE | AVERAGE | STANDARD DEVIATION | LOW | HIGH |
| Formula A | 398.8 | 53.8 | 319 | 467.5 |
| Formula B | 358.6 | 87.9 | 143 | 434.5 |
| Formula A-1* | 495 | 131.6 | 143 | 550 |
| CONTROL | 280.5 | 50.2 | 231 | 341 |

*A different lot of Formula A, formulated at a different time.

What is claimed is:

1. A silver-glass paste comprising silver flake, lead vanadium telluride glass, resin, surfactant and a mixture of solvents, said mixture comprising at least two solvents selected from the group consisting of glycol ether, isoparaffin, and terpineol, each of said solvents having a boiling point of from about 170° C. to about 230° C. and a surface tension of from about 20 to about 30 dynes/cm$^2$ wherein said silver flake is present in an amount of between about 55 to about 80% by weight, said glass is present in an amount of between about 5 to about 25% by weight, said resin is present in an amount of between about 0.3 and about 2% by weight, said surfactant is present in an amount of between about 0.1 and about 1.5% by weight and said mixture of solvents is present in an amount of between about 5 to about 20% by weight, said glass being composed of from about 15 to about 40 wt. % of PbO, about 20 to about 50% of $V_2O_5$, about 15 to about 40 wt. % of $TeO_2$, about 5 to about 15 wt. % of $Bi_2O_3$, and about 0 to about 1 wt. % of MgO.

2. The paste of claim 1, wherein said surface tension is between about 22 and about 27 dynes/cm$^2$.

3. The paste of claim 1, wherein the mixture of solvents is a mixture of terpineol and glycol ethers in amounts of from about 1% to 6% by weight of the paste for each solvent.

4. The paste of claim 1, wherein the mixture of solvents is a mixture of terpineol, glycol ethers and isoparaffins in amounts of from about 1% to 6% by weight of the paste for each solvent.

5. The paste of claim 3, wherein the glycol ethers are a mixture of propylene glycol n-butyl ether, dipropylene glycol n-butyl ether, and dipropylene glycol monomethyl ether.

6. The paste of claim 4, wherein the glycol ethers are a mixture of dipropylene glycol n-butyl ether and dipropylene glycol monomethyl ether.

* * * * *